Dec. 19, 1950         H. M. PURCELL         2,534,988
METHOD AND APPARATUS FOR MOLDING
Filed Oct. 7, 1946         5 Sheets-Sheet 1
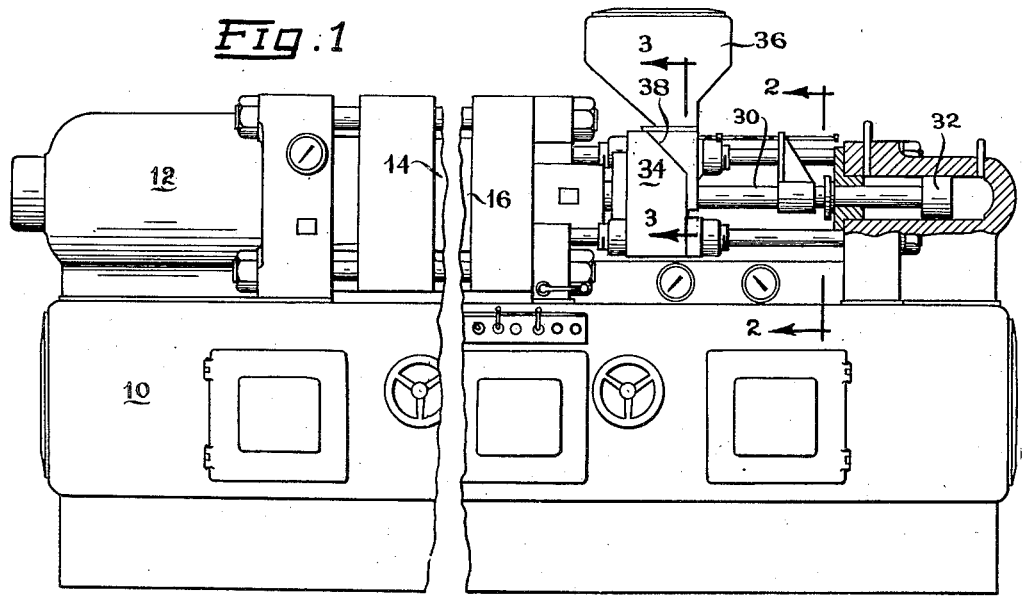
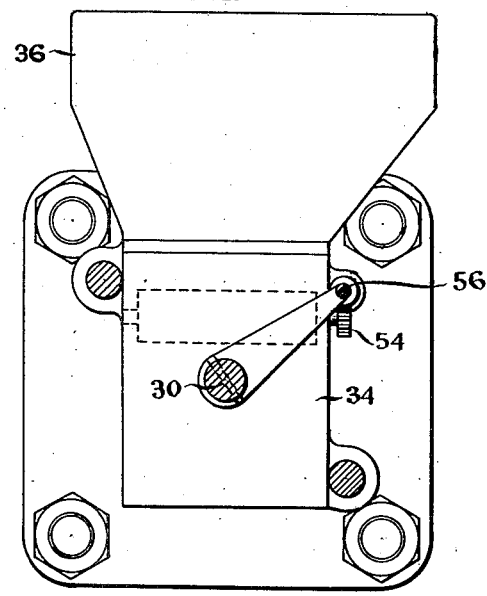
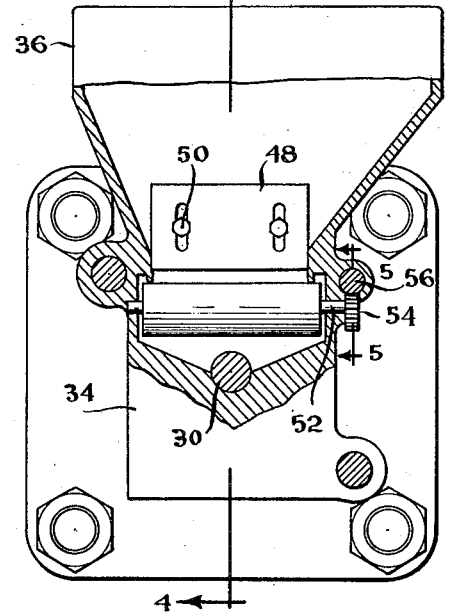
INVENTOR
HOWARD M. PURCELL
BY
Toulmin & Toulmin
ATTORNEYS

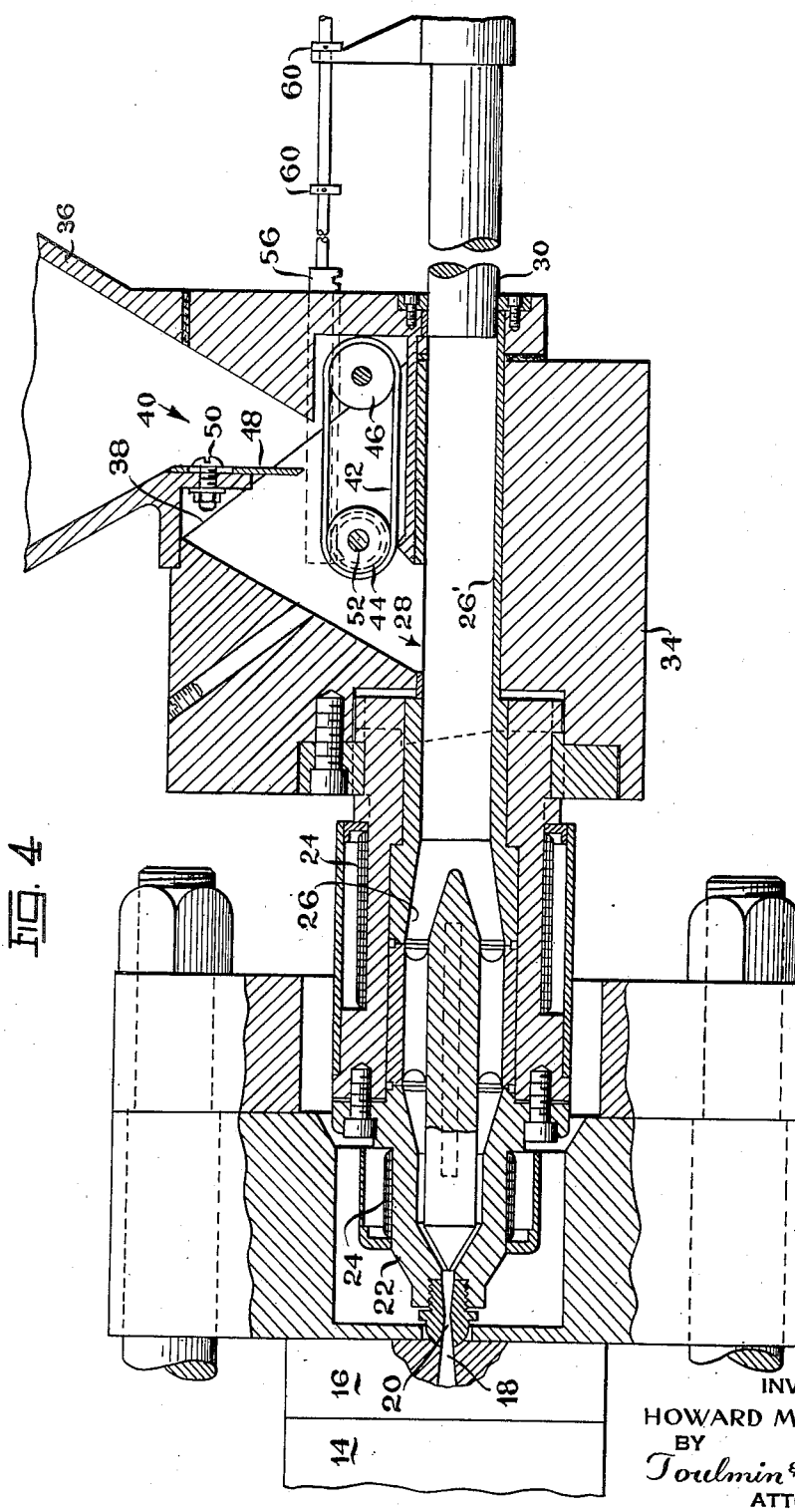

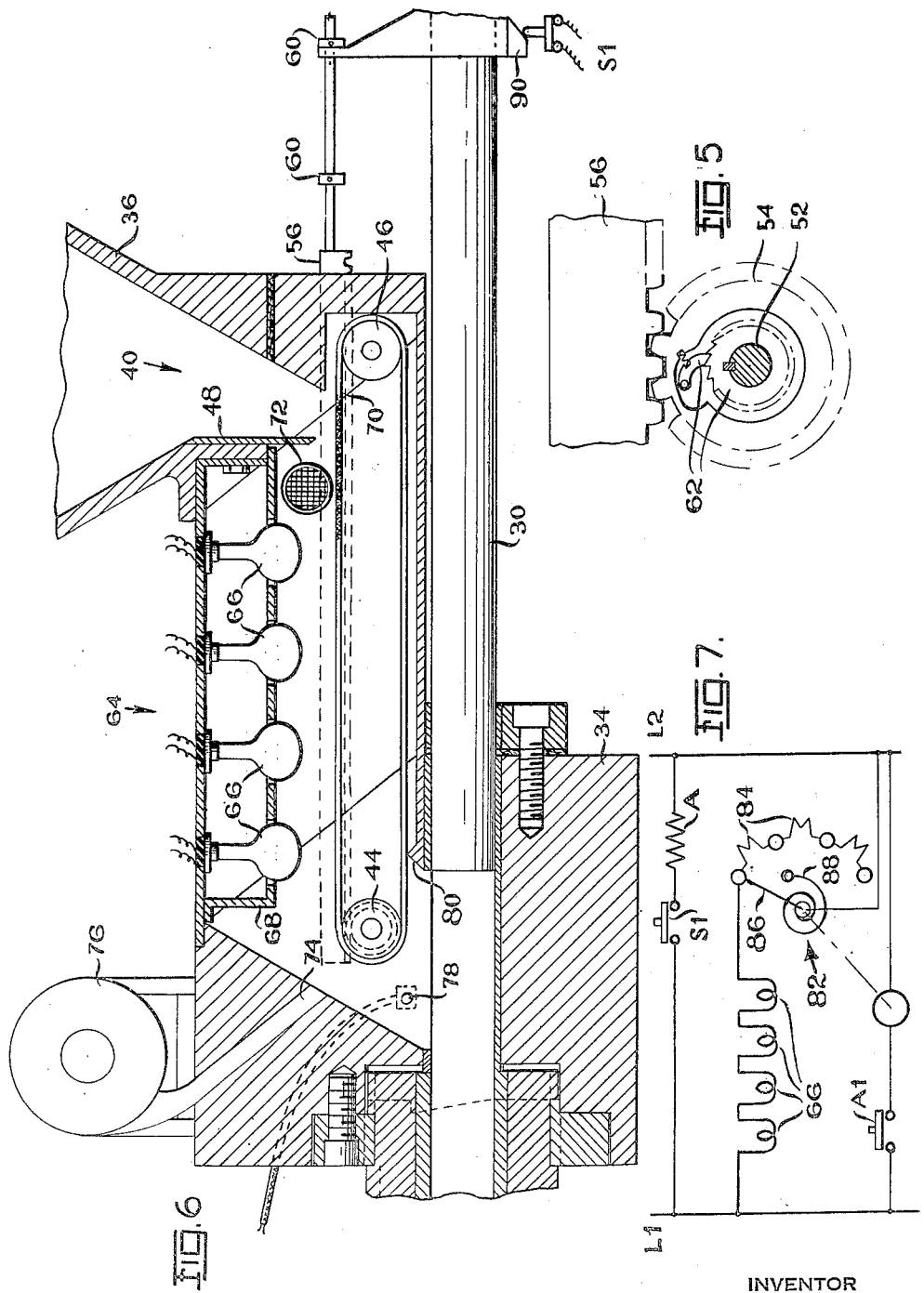

Dec. 19, 1950          H. M. PURCELL          2,534,988
METHOD AND APPARATUS FOR MOLDING
Filed Oct. 7, 1946          5 Sheets-Sheet 4
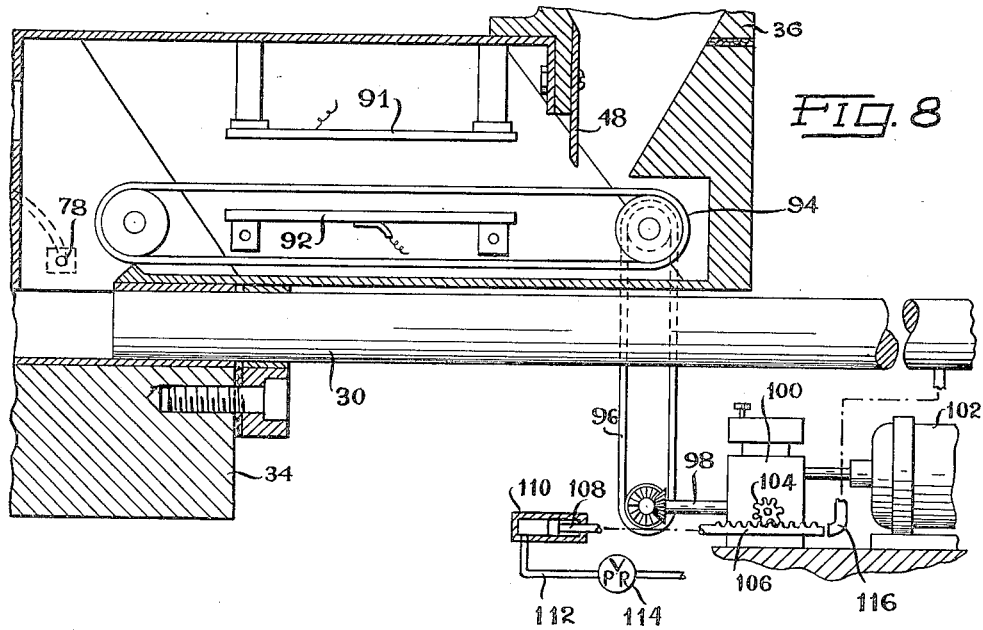
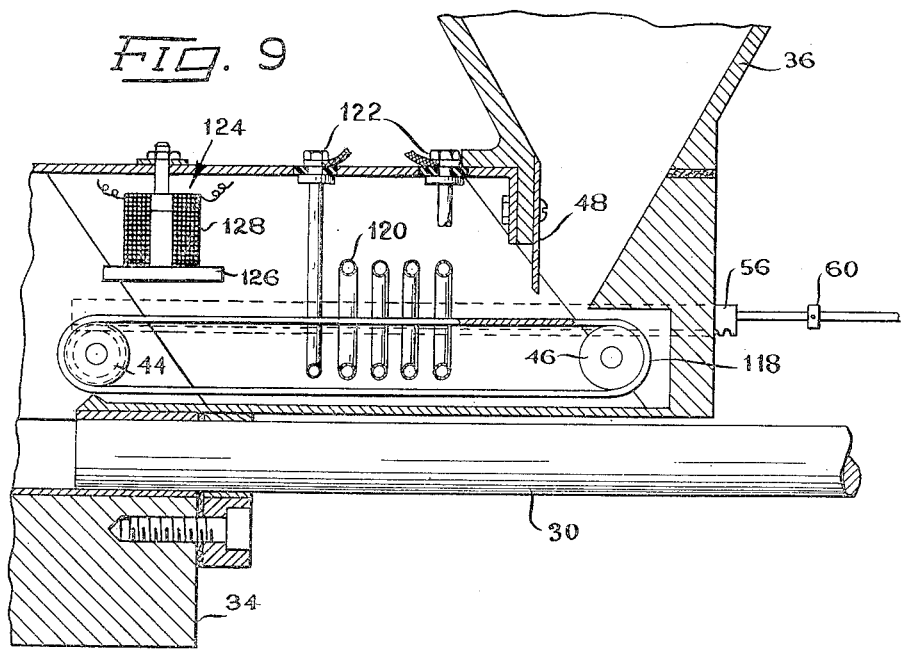
INVENTOR
HOWARD M. PURCELL
BY
Toulmin & Toulmin
ATTORNEYS

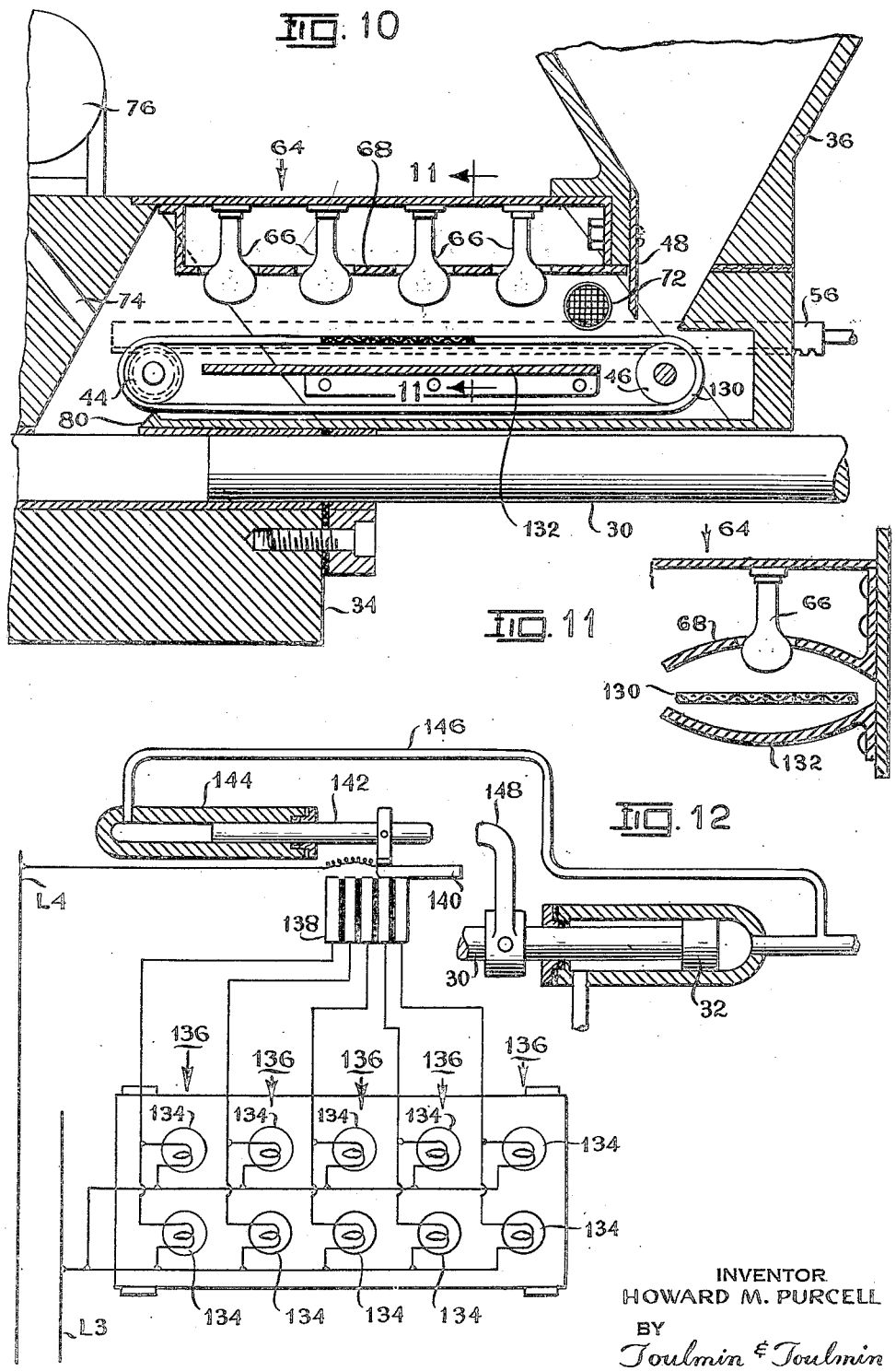

Patented Dec. 19, 1950

2,534,988

UNITED STATES PATENT OFFICE 2,534,988

METHOD AND APPARATUS FOR MOLDING

Howard M. Purcell, Mount Gilead, Ohio, assignor to H-P-M Development Corporation, Wilmington, Del., a corporation of Delaware Application October 7, 1946, Serial No. 701,714

4 Claims. (Cl. 18—30)

This invention relates to molding machines and methods in connection therewith, and particularly to a method and apparatus for extrusion molding.

In the extrusion molding of materials such as plastics, the material is usually fed from a hopper into a heating chamber wherein the material becomes softened by the application of heat and is thereafter extruded from the said heating chamber through a nozzle into a closed mold. The material is either cooled or cured in the mold and thereafter a finished workpiece can be ejected.

Usually, it is necessary that the heating chamber be of sufficient size to retain a quantity of the material being plasticized therein after each extrusion cycle. This is done to insure a suitably plasticized supply of the material for the next molding cycle. In many cases, it is found that the type of material being molded, the size of the mold being filled, and the nature of the workpiece being molded, permit a high speed overall molding cycle.

In such cases, it is found that the controlling factor in the speed of cycling of the machine is the length of time required properly to plasticize the molding material in the heating chamber. This is due to the fact that if the material is fed into the heating chamber in a granular state, and cold, the heating thereof must take place by conduction through the material from the walls of the heating chamber. It has also been found that by inserting a torpedo or spreader in the heating chamber, and by heating the said spreader, a faster plasticization of the material occurs, but even this is not sufficiently rapid for a high speed molding cycle.

Most plastic materials absorb a certain amount of moisture between the time they are manufactured and the time they are placed in the molding machine. Such plastics evolve a considerable amount of water vapor when they are heated which has a tendency to be passed into the mold and to create voids and cavities therein, or to become admixed with the extruded plastic so that the resulting product is porous and weak, or develops blisters or surface flaws.

The difficulty of the plastic molding material absorbing moisture can be overcome by preheating the material a predetermined amount prior to the molding thereof. This, however, requires a separate machine from the molding machine and furthermore requires that a quantity of the material be preheated so as to be available for the molding machine. Then, if the molding machine ceases operation for any reason, the preheated plastic must be allowed to cool and reabsorbs the moisture that had previously been driven off. Furthermore, many of the plastics will begin to cure when they are heated so that unless they are molded immediately there is a decrease in the quality thereof. This is especially true in the case of the thermal setting plastics, but is evident also in the materials known as thermoplastics because there is a certain loss of the plasticizers therein with every heating which loss adversely affects the moldability of the material and the quality of the workpieces produced.

The principal object of the present invention is to overcome the aforementioned difficulties by providing in connection with the molding machine a novel means for preheating the plastic material immediately before it is received into the heating chamber of the machine.

It is another object to provide means for automatically measuring the amount of material being fed to the machine so that there is no accumulation of preheated material should the machine be shut down for any reason.

A still further object is the provision of a method of supplying material to an extrusion machine, and preheating the same, which results in a higher speed overall molding cycle, thereby utilizing the extrusion machine and the skilled operator's time to the fullest extent.

A still further object is the provision of automatic control means in connection with an extrusion machine feeding arrangement according to the foregoing objects which automatically halts the preheating of the material when the machine sets idle.

Another object is the provision of a feeding and preheating device according to this invention which can readily be converted from a simple feeding arrangement into a combined feeding and preheating device.

A still further object is to provide in combination with an extrusion machine feeding device according to the foregoing objects, means for separating magnetic particles from the material as it passes through the said device.

These and other objects and advantages will become more apparent upon reference to the following description taken in connection with the accompanying drawings in which:

Figure 1 is a side elevation of a typical extrusion molding machine adapted for being operated according to the methods of this invention and having installed thereon a feeding unit according to this invention;

Figure 2 is a transverse section taken on the line 2—2 of Figure 1;

Figure 3 is a transverse section taken on the line 3—3 of Figure 1;

Figure 4 is a vertical longitudinal section indicated by the line 4—4 on Figure 3;

Figure 5 is a fragmentary view showing the feeding device drive mechanism;

Figure 6 is a view similar to Figure 4 but showing the device modified for the preheating of the molding material as it passes through the feeding unit;

Figure 7 is a diagram of the electrical circuit to be employed in connection with the arrangement of Figure 6;

Figure 8 is a fragmentary view showing a modified arrangement utilizing a different heating means and a different drive for the feeding unit conveyor;

Figure 9 is a view similar to Figure 8 but showing still another heating means and a magnetic separator to remove metal particles from the material;

Figure 10 is a view similar to Figure 6 but showing a fabric conveyor belt backed up by a plate that reflects the heat which passes through the material and belt back to the material for efficient utilization of the heat supply;

Figure 11 is a transverse section indicated by the line 11—11 on Figure 10; and

Figure 12 is a fragmentary view showing one arrangement for automatically controlling the energization of the heating lamps of the feeding unit in accordance with the amount of material to be fed thereby.

General arrangement

According to this invention, an extrusion molding machine having a heating and extrusion chamber with an extrusion plunger reciprocable therein is provided with a conveying means consisting of a belt for transferring the material to be molded from a hopper into the heating chamber.

The aforementioned belt is adapted for being driven by the extrusion plunger during its forward travel by suitable means such as a rack and gear with a one-way ratchet drive thereon.

Optionally, and preferably, the belt in traveling from the hopper to the point where it discharges the materal into the heating chamber passes through a heating zone which may comprise infra-red heat lamps, a high frequency electric field, or a high frequency magnetic field. In passing through the aforementioned zone the plastic material is preheated and has the moisture driven therefrom so that a minimum length of time is required for bringing the material to molding temperature within the heating chamber.

This invention includes means for automatically regulating the amount of material discharged into the heating chamber, and further has means for controlling the amount of heat supplied to the material so that it is not preheated to the extent that it begins to become sticky and difficult to handle before it enters the heating chamber.

Structural arrangement

Referring to the drawings, 10 indicates the bed of an extrusion machine having a clamping motor 12 adapted for clamping together the mold halves 14 and 16. The mold half 16 includes a sprue opening 18 which communicates with the nozzle 20 of a heating chamber 22 having suitable heating means such as the electric heaters indicated at 24 for bringing the plastic material in the bore 26 thereof to molding temperature.

The molding material is introduced into the heating chamber through an aperture 28 and is expelled therefrom by an extrusion plunger 30 reciprocable in the bore 26 and having connected therewith the double acting fluid operable plunger 32.

The heating chamber 22 is preferably carried on a stationary block 34 which has the bore 26' therein which is a continuation of the bore 26 of the heating chamber.

The extrusion machine comprises a supply hopper 36 within which the material to be molded is placed and from which the said material is measured into the heating chamber via the aperture 28.

Reference to Figures 2, 3 and 4 will reveal that the hopper 36 is adapted for being mounted on the block 34 as indicated by the diagonal plane of separation at 38. The hopper has an opening 40 in the lower end thereof which opens directly into a conveyor belt 42 which is carried between a roller 44 journalled in the block 34 and a roller 46 which is journalled in the hopper assembly. A blade 48 is adjustably secured to the hopper as by the screw and slot arrangement at 50 and is effective to regulate the thickness of the layer of material which is conveyed from the hopper opening by the belt 42.

The shaft 52 of the roller 44 extends through the side of the block 34 and carries a gear 54 as seen in Figures 2 and 3. The gear 54 is continuously in mesh with a rack 56 which has an extension thereon passing through an arm 58 secured to the extrusion plunger 30. The spaced collars indicated at 60 in Figure 4 provide for limited relative movement of the arm 58 and rack 56 so that during reciprocation of the plunger 30, the rack 56, and therethrough the gear 54 are driven a predetermined amount.

Referring to Figure 5 it will be noted that the gear 54 is connected with the shaft 52 through a ratchet and pawl mechanism indicated at 62 which provides for a driven connection between the gear and shaft when the said gear is rotating clockwise, as viewed in Figure 5, while permitting the said gear to rotate in the opposite direction freely. Thus, during the forward stroke of the extrusion plunger 30, the shaft 52 is driven a predetermined amount while during the retraction stroke of the plunger 30, the shaft remains idle. The driving of the shaft 52 drives the roll 44 in a direction to cause the conveyor belt 42 to transfer plastic from the hopper 36 to the heating chamber. The conveyor belt 42 may comprise a suitably strong fabric material such as a heavy canvas, leather, a reinforced rubber-like material, or a metallic ribbon, as desired, it being apparent that the particular material from which the belt is manufactured being immaterial with regard to its conveying properties.

Referring now to Figure 6, there is shown an arrangement wherein the plastic material is heated during its passage from the hopper to the heating chamber. In this figure, the same block 34 and the same hopper 36 may be employed but between the said hopper and block there is a heating unit generally indicated at 64. This heating unit comprises a frame adapted for being mounted on the end of the block 34 in place of the hopper and being shaped at its opposite end to receive the said hopper. The frame comprises a bank of heating lamps indicated at 66 which are well-known in the trade and which give off radiation which is high in infra-red heating rays.

These lamps may be of the type having a reflecting means built therein and the rays therefrom may be further directed by a reflector member 68 carried in the frame. The lamps are distributed over the belt 70 which differs from the conveyor belt 42 in being substantially longer since it must traverse the heating unit 64. As shown in Figure 6, the belt 70 is preferably of metal and is polished so that the heat rays which pass through the material carried thereon will be reflected from the polished surface of the metal back through the material and thereby make efficient use of the said heat rays. While any of several metals may be used for the belt 70, it has been found that a polished Monel metal or a nickel steel is quite satisfactory.

As mentioned before, the heating of the plastic material as it is carried through the heating station will evolve a fairly large quantity of water vapor. In order to prevent an accumulation of this vapor within the heating device, the said device includes one or more air inlets which comprise screened openings as indicated at 72 and a discharge opening as at 74 which leads to the inlet of a blower 76. The operation of the blower 76 causes a continuous passage of air through the heating station thereby to draw off the evolved vapors therefrom.

The supply of electric power to the heating lamps 66 is preferably controlled so that the preheating of the molding material is sufficient to drive substantially all of the moisture therefrom but is just less than that required for the material to begin to soften. This difference prevents the molding material from becoming sticky and adhering to the conveyor belt. The power to the lamps may be thermostatically controlled according to well-known processes by disposing a thermostatic element 78 in a position where it is responsive to the temperature of the material passing from the conveyor belt to the heating chamber. Should the plastic material become slightly sticky in its passage through the heating station, the block 34 may include a scraping means as at 80 which scrapes all of the material from the belt in its passage around the roller 44.

In the operation of an extrusion machine such as indicated, there are times when it is not possible to operate the machine on a full automatic cycle. Such delays in the operation of the machine occur when the molds are being changed or cleaned, when the hopper is being filled, when there is any repair work to be done on the machine, or for any of several other reasons. During such a delay, it is necessary that the heating lamps be reduced in intensity or shut off entirely so that the molding material which is on the conveyor belt during the delay does not become completely heated to plasticization, or until it is cured.

To this end, the lamps are preferably connected in an electric circuit such as is shown in Figure 7. In this figure the power lines L1 and L2 have connected therebetween the lamps 66 in series with the rheostat mechanism generally indicated at 82. The rheostat mechanism includes the resistor bank 84 and an arm 86 for sweeping over the said bank. A spring means 88 normally retains the arm in the position shown in the drawings wherein the rheostat bank is completely cut out and full voltage is supplied to the heat lamps.

When the extrusion plunger 30 is fully retracted, a cam 90 carried thereby engages and closes a switch S1 which, as shown in Figure 7, is connected in series between the lines L1 and L2 with a contactor coil A. The contactor coil A has associated therewith a normally open blade A1 which is connected in series with a timing motor T between the lines L1 and L2. When A is closed, the timing motor T commences to operate either at low speed, or after a predetermined delay period, to swing the arm 86 clockwise over the resistor bank 84. This gradually reduces the voltage supplied to the lamps 66 until, when the arm 86 is in its extreme clockwise position, the power supplied to the said lamps is only sufficient to maintain the molding material on the conveyor belt beneath the lamps at a temperature which is preferably somewhat below the usual preheated temperature. This maintains the machine in condition for immediately recommencing operation but does so without the danger of completely plasticizing the material on the belt or permitting it to cure.

In Figure 8 there is shown a modified arrangement somewhat similar to Figure 6 and in which similar parts bear corresponding numbers. Figure 8, however, employs, instead of heat lamps 66, a pair of plates 91 and 92 which are positioned one on either side of the conveyor belt 94. The plates 91 and 92 are connected to a source of high frequency electrical energy so that a high frequency electrical field is established therebetween which passes through the material on the belt and heats the said material by the dielectric loss therein.

It will be apparent that the belt 94 in Figure 8 is preferably of a fabric material rather than metallic in order to prevent arcing through the material by the electric field due to concentration of the said field at the surface of the belt because of the un-uniform cross section of the material thereon.

Figure 8 also illustrates a modified arrangement for driving the conveyor belt. In this view there is a belt or chain as indicated at 96 which drives into one of the belt conveying rollers and which, in turn, is driven from the output shaft 98 of an adjustable speed reducer 100 which is driven by an electric motor 102. The variable speed transmission 100 is adjustable in its driving ratio by a pinion 104 which is in mesh with a rack 106. When the rack is moved to the right, the speed of the shaft 98 is reduced and when the rack is moved to the left, the speed of the shaft 98 is increased. The speed of the transmission is automatically varied in order to insure a uniform stroke of the extrusion plunger 30 by connecting with the said rack a plunger 108 which reciprocates in a cylinder 110.

The cylinder 110 is connected by a conduit 112 to a relief valve 114 with the advancing side of the fluid operable ram which actuates the extrusion plunger. Then, when the extrusion plunger moves in the advancing direction to extrude material from the heating chamber, the actuating pressure on the ram thereof, opens the relief valve 114 at a predetermined time and actuates the plunger 108 to the right to move the pinion 104 in its speed reducing direction. At the same time, the bracket 116 carried by the plunger 30 engages the other end of the rack 106 and moves it to the left, or in its speed increasing position.

When the plunger 30 is retracted, the rack 106 remains in position so that the speed of the shaft 98 is adjusted in accordance with the amount of travel of the plunger 30. It will be apparent that the arrangement is compensating and that an increase in stroke of the plunger 30 will cause an increase in the rate of feed of the molding material, while a decrease in the stroke of the plunger 30 will bring about a decrease in the said rate of feed. Thus, the plunger 30 has a substantially constant stroke at all times and the operation of the preheating means and of the heating chamber is made more uniform, and there is a minimum amount of material within the heating chamber after each extrusion cycle.

In Figure 9 there is illustrated an arrangement similar to that shown in Figures 6 and 8 except that the conveyor belt 118 is formed of a metallic material and there is positioned therearound an induction coil 120 which is supplied with a suitable supply of high frequency electrical energy as by the leads 122. In Figure 9 the heating of the molding material is indirect, the transfer of heat thereto being by conduction from the conveyor belt. Figure 9 also illustrates a magnetic separator 124 which comprises a plate 126 which is energized by a coil 128. The plate 126 is positioned to lie directly over the layer of molding material and is effective to withdraw therefrom magnetic metallic particles which, if passed to the heating chamber, might cause scoring thereof, scoring or scratching of the mold, or damage to the molded workpieces.

In Figure 10 there is shown an arrangement substantially like that illustrated in Figure 6, except that the conveyor belt 130 is formed of a fabric material and the heating device includes a reflector plate 132 which is positioned beneath the said belt to reflect the heat rays which pass therethrough back to the molding material being heated. This insures that there will be a minimum loss of heat from the heating device while permitting the use of the more flexible fabric type of conveyor belt.

Referring to Figure 12, there is shown a means for controlling the number of the heating lamps which are illuminated, this control being responsive to the length of stroke of the extrusion plunger. The purpose of this control is to provide for the heating of only the newly fed molding material so that molding material which has previously been preheated and which remains on the conveyor belt will not be raised to too high a temperature and become sticky and difficult to handle.

In Figure 12 the heating lamps are indicated at 134 and will be seen to be arranged in a plurality of banks 136 and in each bank the lamps are connected in parallel with one terminal thereof connected to the power line L3 and the other terminal thereof connected by a wire to one of the contact bars 138.

The contact bars are arranged to be contacted by a contact plate 140 which is connected with the other power line L4. The contact plate 140 is connected with the plunger 142 which reciprocates in a cylinder 144 that receives fluid through the conduit 146 from the advancing area of the extrusion plunger actuating ram 32.

The extrusion plunger 30 carries an arm 148 which is adapted to abut the end of the plunger 142 and to move it in a direction opposite to that in which it is moved by the pressure in the conduit 146. The arrangement is such that when the extrusion plunger meets resistance during an extrusion stroke, the pressure fluid from the advancing side of the ram 32 acts on the plunger 142 to move the contact plate 140 to the right to extinguish the lamps successively from the discharge end of the conveyor belt toward the hopper end thereof. At the same time, the bracket 148, which is moving with the extrusion plunger, engages the plunger 142 and moves it leftwardly. When the plunger 30 is retracted the plunger 142 remains in the position to which it has been moved by the bracket 148. The number of lamps remaining energized will be only those required to preheat the amount of molding material which has been newly fed from the hopper onto the conveyor belt.

It will be apparent that there could be provided suitable multiplying means for increasing the travel of the plunger 142, if desired, and that there could be a greater or a fewer number of the lamps 134, as desired, and that substantially equivalent operation of the arrangement shown in Figure 12 would obtain. In essence, the arrangement shown in Figure 12 provides that the molding material can be preheated at a maximum rate of speed and that it will be subjected to preheating only once in its travel on the conveyor belt. This insures a maximum rate of cycling of the machine while preventing the rate of preheating necessary to obtain that cycling from overheating the said material.

From the foregoing it will be apparent that this invention provides a method and apparatus for molding whereby a substantially higher cycling rate of the molding machine is possible. This greatly increases the production of the machine and decreases the cost of the articles produced. Furthermore, the material being molded is at a more uniform temperature than is possible by carrying out the entire heating cycle thereof in the heating chamber so that workpieces are more uniformly cured and emerge from the molds as a product of better quality. This invention eliminates the necessity of an expensive auxiliary preheater for drying the molding material preparatory to molding and thereby materially reduces the investment in equipment and eliminates a portion of the labor cost in connection with the molding of materials.

It will be noted that an arrangement according to this invention may be employed for the molding of thermal setting materials, these materials ordinarily being difficult to handle by an extrusion process because of the possibility that they will set up within the extrusion cylinder and necessitate expensive delay for the cleaning of the cylinder.

In the molding of such materials by this process, a minimum of material is retained in the extrusion chamber and the cycling rate of the machine is increased so that the said residue is ejected into the mold before it has a chance to become cured. In certain instances, the molding of thermal setting resins according to this invention could be carried out without the torpedo or spreader in the extrusion chamber so that a still further reduction in the residue within the chamber would be affected and the form of the cylinder would be such that the cleaning thereof, if necessary could be carried out much more readily.

It will be understood that this invention is susceptible to modification in order to adopt it to different usages and conditions and, accordingly, it is desired to comprehend such modifications within this invention as may fall within the scope of the appended claims.

I claim:

1. In combination with a molding machine having a hopper with a downward opening discharge and a heating chamber with an upward opening inlet, the said discharge and inlet being horizontally displaced; a horizontally extending belt conveyor for transferring material from said outlet to said inlet; heating means comprising a plurality of infra-red radiators positioned over said conveyor belt for preheating the material thereon; forced air means for continuously passing air across said conveyor belt for withdrawing gases evolved from the heating of said material; and means responsive to the temperature of said material for regulating the energization of said heating means.

2. In a molding machine having a hopper, a heating chamber, and an extrusion plunger; a belt conveyor for conveying material from said hopper to said chamber; heating means comprising a plurality of infra-red heating lamps for preheating the material conveyed by said belt to dispel gases therefrom; forced air means for continuously passing air across said conveyor to remove gases evolved from the heating of said material; and means responsive to the movement of said extrusion plunger to its fully retracted position for instituting a reduction in the energization of said heating lamps.

3. The method of molding materials which soften with the application of heat in a molding machine having a supply hopper and a heating chamber which comprises; conveying the material to be molded from the hopper to the heating chamber; applying heat to the said material during its travel from the hopper to the heating station to increase the temperature of said material and to expel moisture therefrom; forcing a gaseous medium across said material to carry off moisture evolved therefrom during heating; controlling the amount of heat so applied in accordance with the temperature of the material delivered to the heating station; and gradually reducing the amount of heat so applied to a predetermined minimum when the machine is idle.

4. The method of molding materials which soften upon the application of heat in a molding machine having a hopper, a heating and extrusion chamber, and an extrusion plunger which comprises; conveying the material from the hopper to the heating station in a relatively thin ribbon; applying heat to the said ribbon to increase the temperature of the material and to drive off the moisture therefrom; continuously forcing air across said material during conveyance to carry off the moisture evolved therefrom during heating; regulating the amount of heat so applied in accordance with the temperature of the material as it enters the heating chamber; and reducing the amount of heat so applied to a predetermined minimum in accordance with a timed cycle when the extrusion plunger is fully retracted.

HOWARD M. PURCELL.

REFERENCES CITED

The following references are of record in the file of this patent:

UNITED STATES PATENTS

| Number | Name | Date |
| --- | --- | --- |
| 1,566,500 | Northrup | Dec. 22, 1925 |
| 2,033,735 | Pack | Mar. 10, 1936 |
| 2,202,269 | Ryder | May 28, 1940 |
| 2,318,203 | Crosby | May 4, 1943 |
| 2,350,539 | Smith | June 6, 1944 |

FOREIGN PATENTS

| Number | Country | Date |
| --- | --- | --- |
| 595,960 | Germany | Apr. 24, 1934 |
| 422,232 | Great Britain | Jan. 8, 1935 |

OTHER REFERENCES

Modern Plastics, "Heating by Short Wave," October 1942, page 79.

Machine Design, "Applications," September 1946, page 158.